United States Patent [19]

Denslow

[11] 4,389,267
[45] Jun. 21, 1983

[54] METHOD OF FABRICATING A FLEXIBLE COVER BY ULTRASONIC VIBRATIONS

[75] Inventor: Clark A. Denslow, Wilton, Conn.

[73] Assignee: Branson Ultrasonics Corporation, Newtown, Conn.

[21] Appl. No.: 381,066

[22] Filed: May 24, 1982

[51] Int. Cl.³ .............................................. B29C 27/08
[52] U.S. Cl. .................................. 156/73.2; 156/296; 156/308.2; 156/580.1; 264/23
[58] Field of Search ..................... 156/73.1, 73.2, 296, 156/304.2, 304.6, 308.2, 580.1, 580.2; 264/23

[56] References Cited

U.S. PATENT DOCUMENTS 3,440,118  4/1969  Obeda ................................ 156/73.2
3,586,555  6/1971  Sager ................................. 156/73.1
3,756,900  9/1973  Michel .............................. 156/580.2
3,802,987  4/1974  Noll .................................. 156/296

*Primary Examiner*—Michael G. Wityshyn
*Attorney, Agent, or Firm*—Ervin B. Steinberg; Philip J. Feig

[57] ABSTRACT

A flexible cover, blind or shade is fabricated from thermoplastic rod or tubular members which are spaced from another on a support. The free-standing side is engaged by an ultrasonic resonator to bond the members to one another. The pressure exerted during bonding is of such magnitude as to compress and flatten the members to cause a thin web joining juxtaposed members, the web forming a flexible joint.

6 Claims, 5 Drawing Figures

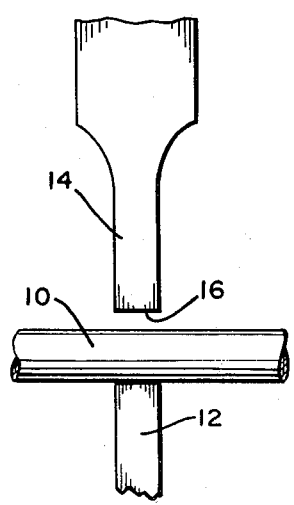
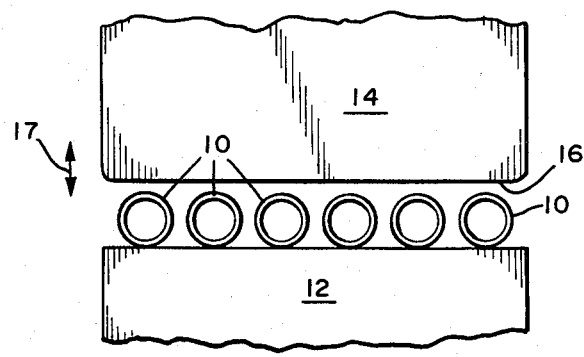
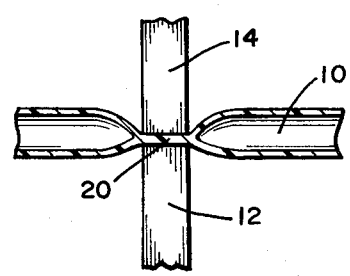
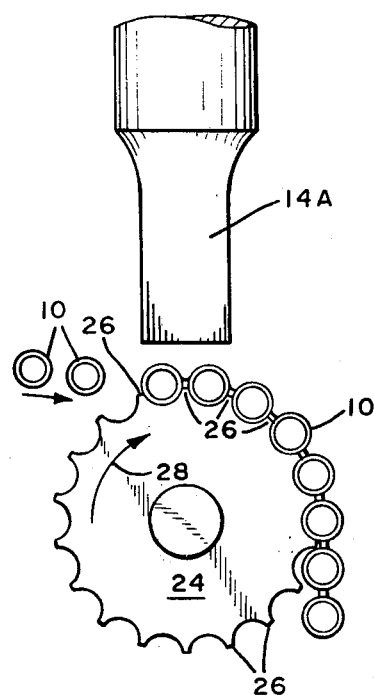
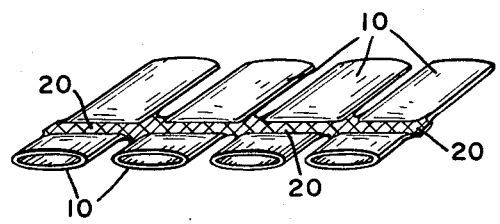

METHOD OF FABRICATING A FLEXIBLE COVER BY ULTRASONIC VIBRATIONS

BRIEF SUMMARY OF THE INVENTION

This invention concerns a method for fabricating a flexible cover, such as a blind or a shade, from tubular or rod thermoplastic members. More specifically, this invention concerns a method for fabricating a flexible cover of the type indicated by ultrasonic vibrations which are used to join juxtaposed tubular or rod type thermoplastic members to each other, such members being joined by a relatively thin web of thermoplastic material which acts as a flexible joint between adjacent members.

The bonding of thermoplastic tubular members to each other, particularly insulated electrical conductors, is shown in U.S. Pat. No. 3,440,118 dated Apr. 22, 1969, issued to E. G. Obeda, entitled "Method and Apparatus for Bonding together a Plurality of Insulated Electrical Conductors by Sonic Energy", and in U.S. Pat. No. 3,586,555 dated June 22, 1971, issued to T. B. Sager, entitled "Apparatus and Method for Continuously Joining Thermoplastic Coated Wires". In both patents juxtaposed electrical conductors are bonded to each other by the use of ultrasonic energy which softens the thermoplastic insulation or coating of the conductors and such insulation upon solidification provides a bond between abutting conductors. The patent to Obeda shows bonding of juxtaposed conductors at spaced distances along the longitudinal axis of the conductors, whereas the patent to Sager describes a continuous bonding of the conductors.

The present invention concerns a similar arrangement except that the rod or tubular thermoplastic members, while in juxtaposition are slightly spaced from one another and when applying ultrasonic energy, the force of the engagement between the members and the ultrasonic energy source, a resonator, is of such magnitude as to significantly compress and flatten the members at the location of engagement and to thereby create a thin web spanning the space between adjacent or neighboring members. The web of thermoplastic material upon solidification forms a flexible joint which causes the plurality of thermoplastic members to be movable with respect to each other in a manner that is required to constitute a flexible shade or flexible cover.

A principal object of this invention, therefore, is the provision of a method for manufacturing flexible covers or flexible shades from thermoplastic tubular or rod members using ultrasonic vibrations.

Another important object of this invention is the provision of a method for fabricating flexible covers or shades in a novel and unique manner.

BRIEF DESCRIPTION OF THE DRAWINGS

FIG. 1 is a schematic elevational view of a typical apparatus for practicing the invention;

FIG. 2 is a side elevational view of FIG. 1;

FIG. 3 is a view similar to FIG. 1 with the resonator in intimate contact with the thermoplastic members to cause a web between neighboring thermoplastic members;

FIG. 4 is a perspective view showing a portion of a flexible shade made in accordance with the present method, and FIG. 5 shows an apparatus, somewhat schematically, for practicing the present invention in a modified manner.

DETAILED DESCRIPTION OF THE INVENTION

Referring now to the figures and FIGS. 1 and 2 in particular, there is shown a plurality of juxtaposed thermoplastic tubular members 10 disposed on a stationary support or anvil 12. It will be noted that the thermoplastic members 10 are slightly spaced from one another. A blade shaped resonator 14, known also as solid horn, tool, mechanical amplitude transformer, etc. is disposed opposite the anvil and has an output surface 16 which is located substantially at an antinodal region of longitudinal motion of the resonator 14 when the resonator is energized at its predetermined frequency for causing the resonator 14 to be resonant as a half wavelength resonator. The resonator 14 usually is driven by an electroacoustic converter which receives its energy from an electrical high frequency generator, see patent to Obeda supra or U.S. Pat. No. 3,790,059 issued to S. E. Jacke and dated Feb. 5, 1974. The resonator is dimensioned to operate preferably at a predetermined frequency in the range from 10 to 50 kHz with typical operating frequencies used in the industry being 20 kHz or 40 kHz or 50 kHz. When resonant, the output surface of the resonator undergoes vibrations as is indicated by the double headed arrow 17. The resonator 14 may be constructed as shown in U.S. Pat. No. 3,113,225 issued to C. Kleesattel, dated Dec. 3, 1963.

When the resonator 14 is brought into engagement with the thermoplastic members 10, responsive to the ultrasonic vibrations manifest at the output surface 16 and the engagement pressure between the resonator and the members 10, thermoplastic material softens and flows at the area of contact between the resonator surface 16 and the thermoplastic members 10. In the present invention it is important that the engagement pressure be of such magnitude as to compress and flatten the thermoplastic members in a manner that there is created a thin web of thermoplastic material 20 which flows from one juxtaposed thermoplastic member 10 toward the other, see FIG. 3. Upon the cessation of the ultrasonic energy, the pressure between the compressed thermoplastic members 10 and the resonator 14 is maintained during a brief dwell period during which the displaced thermoplastic material solidifies and forms a bond between each pair of juxtaposed thermoplastic members. When the resonator is withdrawn, there will be result an arrangement substantially as shown in FIG. 4 wherein the thermoplastic members are joined to each other by a thin connecting web 20. Such bonding by means of a web 20 most suitably is accomplished at spaced intervals along the longitudinal axis of the members. If the thermoplastic web is made sufficiently thin the bonded members can be rolled or unrolled in a manner that is known with window shades.

It will be apparent to those skilled in the art that the thermoplastic members may be flexible or rigid and may be of tubular, round or other shape, and in a similar manner may be of solid round, rectangular, or polygonal cross-section.

FIG. 5 discloses a typical apparatus for bonding two thermoplastic members together. A toothed wheel 24 has disposed around its periphery suitably shaped openings 26 for receiving therein thermoplastic members 10. Each tool 26 is positioned and shaped to provide a flat surface anvil. As the wheel 24 rotates and the resonator 14A vibrates and coats with the wheel, each set of two juxtaposed thermoplastic members is joined by a web. The spacing between the members and the length of the connecting web is given by the width of the respective teeth 26. If the wheel rotates in clockwise direction, arrow 28, the left side of the wheel must be loaded with thermoplastic members while on the right side a continuous chain of bonded members emerges. It will be apparent that in order to provide a shade, the arrangement as shown in FIG. 5 is duplicated at spaced intervals along the axis of the members 10. As required by the ultrasonic bonding process, the wheel 24 may be driven continuously or is driven intermittently. The resonator 14A in FIG. 5, of course, has a much smaller output surface than the resonator 14 in view of the fact that in FIG. 5 only two memebers are bonded at a time.

What is claimed is:

1. The method of fabricating a flexible cover, such as a blind or shade, from tubular or rod thermoplastic members comprising:

providing a support;

disposing on said support a plurality of such members juxtaposed in spaced substantially parallel alignment with one another;

engaging the exposed side of said aligned members with an ultrasonically vibrating resonator at axially spaced locations of said members and exerting such engagement pressure between said resonator and members as to cause said members at such spaced locations to become flattened against said support and produce a relatively thin web of flowed thermoplastic material;

such web joining each set of two juxtaposed members and providing responsive to the cessation of ultrasonic vibrations and solidification of the flowed thermoplastic material a flexible joint between a pair of adjacent members.

2. The method of fabricating a flexible cover as set forth in claim 1, said resonator being shaped to engage simultaneously at least two adjacent members.

3. The method of fabricating a flexible cover as set forth in claim 2, said resonator being blade shaped, the major axis of the surface of said blade engaging said members being disposed substantially normal to the longitudinal axis of said tubular members.

4. The method of fabricating a flexible cover as set forth in claim 1, said resonator vibrating at a frequency in the range from 10 to 50 kHz.

5. The method of fabricating a flexible cover as set forth in claim 1, said support comprising a flat surface.

6. The method of fabricating a flexible cover as set forth in claim 1, said support comprising a toothed wheel.

* * * * *